(12) United States Patent
McGrath et al.

(10) Patent No.: US 8,211,594 B2
(45) Date of Patent: *Jul. 3, 2012

(54) COMPOSITIONS OF NANOMETAL PARTICLES CONTAINING A METAL OR ALLOY AND PLATINUM PARTICLES

(75) Inventors: Kimberly McGrath, Newport Beach, CA (US); R. Douglas Carpenter, Tustin, CA (US)

(73) Assignee: QuantumSphere, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/110,841

(22) Filed: May 18, 2011

(65) Prior Publication Data

US 2012/0028163 A1 Feb. 2, 2012

Related U.S. Application Data

(63) Continuation of application No. 11/781,909, filed on Jul. 23, 2007, now Pat. No. 7,955,755, which is a continuation-in-part of application No. 11/394,456, filed on Mar. 31, 2006, now abandoned.

(51) Int. Cl.
*H01M 4/02* (2006.01)
*H01M 4/36* (2006.01)
*H01M 4/92* (2006.01)

(52) U.S. Cl. ............. 429/524; 252/506; 502/185

(58) Field of Classification Search ........... 429/483, 429/524, 535; 502/185, 159, 339; 252/182.1, 252/506

See application file for complete search history.

(56) References Cited

U.S. PATENT DOCUMENTS

| 4,276,144 A | 6/1981 | Hahn et al. |
| 4,391,668 A | 7/1983 | Armstrong |
| 4,407,907 A | 10/1983 | Takamura et al. |
| 4,569,924 A | 2/1986 | Ozin et al. |

(Continued)

FOREIGN PATENT DOCUMENTS

EP 1479649 A1 11/2004

(Continued)

OTHER PUBLICATIONS

U.S. Appl. No. 13/095,689, filed Apr. 27, 2011, Dopp et al.

(Continued)

*Primary Examiner* — Jerry Lorengo
*Assistant Examiner* — Carlos Barcena
(74) *Attorney, Agent, or Firm* — Knobbe, Martens, Olson & Bear, LLP

(57) ABSTRACT

A composition comprising an admixture of at least platinum particles and metal nanoparticles of metal that, when in admixture with the platinum particles, beneficially alters the characteristics of the platinum, including metals selected from one or more of the metals in groups 3-16, lanthanides, combinations thereof, and/or alloys thereof. The composition could be used to form an ink that further comprises an ionically conductive material, such as a polymer, capable of ionic networking throughout the ink composition so as to create a substantially structurally coherent mass without significantly impacting the reactivity of a substantial number of the nanoparticles. In one application, the ink may be used to form a catalyst whereby the ink is applied to an electrically conductive backing material, such as carbon paper or fibers. In another application, the ink may be used to form an electrode whereby the ink may be applied to an electrically conductive material, and wherein the ink comprises an admixture of platinum particles and metal nanoparticles.

3 Claims, 9 Drawing Sheets

U.S. PATENT DOCUMENTS

| | | | |
|---|---|---|---|
| 4,780,954 A | 11/1988 | Kato | |
| 4,917,972 A | 4/1990 | Notoya et al. | |
| 4,931,168 A | 6/1990 | Watanabe et al. | |
| 5,079,674 A | 1/1992 | Malaspina | |
| 5,308,711 A | 5/1994 | Passaniti et al. | |
| 5,378,562 A | 1/1995 | Passaniti et al. | |
| 5,464,709 A | 11/1995 | Getz et al. | |
| 5,576,117 A | 11/1996 | Morita et al. | |
| 5,773,162 A | 6/1998 | Surampudi et al. | |
| 5,861,222 A | 1/1999 | Fischer et al. | |
| 5,865,968 A | 2/1999 | Denton et al. | |
| 6,007,934 A | 12/1999 | Auer et al. | |
| 6,066,410 A | 5/2000 | Auer et al. | |
| 6,277,447 B1 | 8/2001 | Chun et al. | |
| 6,297,185 B1 | 10/2001 | Thompson et al. | |
| 6,372,509 B1 | 4/2002 | Foerster et al. | |
| 6,528,201 B1 | 3/2003 | Hitomi | |
| 6,582,763 B1 | 6/2003 | Nishimura et al. | |
| 6,670,301 B2 | 12/2003 | Adzic et al. | |
| 6,753,108 B1 | 6/2004 | Hampden-Smith et al. | |
| 6,835,489 B2 | 12/2004 | Venkatesan et al. | |
| 6,866,960 B2 | 3/2005 | Tsumura et al. | |
| 6,967,183 B2 | 11/2005 | Hampden-Smith et al. | |
| 7,211,345 B2 | 5/2007 | Hampden-Smith et al. | |
| 7,553,513 B2 | 6/2009 | Yamada et al. | |
| 7,955,755 B2 * | 6/2011 | McGrath et al. | 429/524 |
| 2003/0054218 A1 | 3/2003 | Hampden-Smith et al. | |
| 2003/0108781 A1 | 6/2003 | Oh et al. | |
| 2003/0148182 A1 | 8/2003 | Park et al. | |
| 2004/0013601 A1 | 1/2004 | Butz et al. | |
| 2004/0131934 A1 | 7/2004 | Sugnaux et al. | |
| 2004/0133045 A1 | 7/2004 | Okanobori et al. | |
| 2004/0241537 A1 | 12/2004 | Okuyama et al. | |
| 2004/0248730 A1 | 12/2004 | Kim et al. | |
| 2005/0142282 A1 | 6/2005 | Chang et al. | |
| 2005/0203312 A1 | 9/2005 | Pessoa Cavalcanti et al. | |
| 2006/0002844 A1 | 1/2006 | Suenaga et al. | |
| 2006/0078784 A1 | 4/2006 | Liu et al. | |
| 2006/0093892 A1 | 5/2006 | Min et al. | |
| 2006/0135359 A1 | 6/2006 | Adzic et al. | |
| 2006/0247122 A1 | 11/2006 | Hampden-Smith et al. | |
| 2006/0263675 A1 | 11/2006 | Adzic et al. | |
| 2007/0026294 A1 | 2/2007 | Shimazaki | |
| 2007/0092784 A1 | 4/2007 | Dopp et al. | |
| 2007/0166455 A1 | 7/2007 | Shen et al. | |
| 2007/0227300 A1 | 10/2007 | McGrath et al. | |
| 2008/0166259 A1 | 7/2008 | Kijima et al. | |
| 2008/0280190 A1 | 11/2008 | Dopp et al. | |
| 2009/0162715 A1 | 6/2009 | Burdzy | |
| 2009/0170693 A1 | 7/2009 | Ikeda | |
| 2009/0297924 A9 | 12/2009 | Shimazaki et al. | |
| 2010/0069228 A1 | 3/2010 | Dopp et al. | |
| 2010/0167175 A1 | 7/2010 | Dopp et al. | |
| 2011/0091787 A1 | 4/2011 | McGrath et al. | |
| 2011/0091796 A1 | 4/2011 | Dopp et al. | |
| 2011/0130269 A1 | 6/2011 | Dopp et al. | |
| 2011/0190116 A1 | 8/2011 | Dopp et al. | |

FOREIGN PATENT DOCUMENTS

| | | |
|---|---|---|
| JP | 11-067225 A | 3/1999 |
| JP | 2005-100713 A | 4/2005 |
| JP | 2005-276688 A1 | 10/2005 |
| KR | 10-0550998 B1 | 2/2006 |
| WO | WO 97/21256 | 6/1997 |
| WO | WO 00/36676 | 6/2000 |
| WO | WO 2004/095603 | 11/2004 |
| WO | WO 2005/093881 | 10/2005 |
| WO | WO 2006/093317 | 9/2006 |
| WO | WO 2006/129413 | 12/2006 |
| WO | WO 2007/063615 | 6/2007 |

OTHER PUBLICATIONS

International Search Report—PCT/US2007/072996 dated Jul. 17, 2008.

International Preliminary Report on Patentability—PCT/US2007/072996 dated Jan. 13, 2009.

International Search Report—PCT/US2007/008182 dated May 28, 2008.

International Preliminary Report on Patentability—PCT/US2007/008182 dated Sep. 30, 2008.

International Search Report—PCT/US2008/70929 dated Oct. 24, 2008.

International Preliminary Report on Patentability—PCT/US2008/070929 dated Jan. 26, 2010.

Examiner's First Report for Australian Application No. 2007-340313, dated Nov. 8, 2010, in 4 pages.

First Office Action for Chinese Patent Application No. 200780017384.6, issued Jun. 10, 2010 in 10 pages.

Office Action for Application No. 07 835 722.5—1227 dated Jun. 22, 2009.

"Chevron Phillips Black® AB100% Acetylene Black, 100% Compressed". MatWeb. Accessed on: Sep. 14, 2010. http://www.matwebcom/search/datasheet_print.aspx?matguid=0f55f7504b72417092884bf744a6a440.

Database Compendex [Online] Engineering Information, inc., Jun. 21, 2006, McGrath, et al.; Improved electrocatalytic activity of oxygen reduction on platinum using nano-cobalt in direct methanol fuel cell cathode electrodes.

Hess et al., "Microstructure, Morphology, and General Physical Properties: Porosity," in Carbon Black 121-126 (2nd ed., Donnet, J.B. et al. eds., Marcel Dekker Inc., New York, NY, USA 1993).

Koffi et al., "Synthesis, characterization and electrocatalytic behaviour of non-alloyed PtCr methanol tolerant nanoelectrocatalysts for the oxygen reduction reaction (ORR)," Electrochimica Acta, Jul. 25, 2005, pp. 4117-4127, vol. 150-iss. 20.

Shawinigan Black, 100% Compressed, from matweb.com.

Toda et al., "Enhancement of the Electroreduction of Oxygen on Pt Alloys with Fe, Ni, and Co," Journal of the Electrochemical Society, 1999, pp. 3750-3756, vol. 146-iss. 10.

Wakabayashi et al., "Temperature Dependence of Oxygen Reduction Activity at Pt—Fe, Pt—Co, and Pt—Ni Alloy Electrodes," Journal of Physical Chemistry B, Mar. 5, 2005, pp. 5836-5841, vol. 109-iss. 12.

Yang et al., "Structure and Electrocatalytic Activity of Carbon-Supported Pt—Ni Alloy Nanoparticles Toward the Oxygen Reduction Reaction," Journal of Physical Chemistry B, Jun. 25, 2004, pp. 11024-11034, vol. 108-iss. 30.

* cited by examiner

US 8,211,594 B2

COMPOSITIONS OF NANOMETAL PARTICLES CONTAINING A METAL OR ALLOY AND PLATINUM PARTICLES

CROSS-REFERENCE TO RELATED APPLICATIONS

This application is a continuation of U.S. patent application Ser. No. 11/781,909, filed Jul. 23, 2007, which is a continuation-in-part of U.S. patent application Ser. No. 11/394,456 filed Mar. 31, 2006, the contents of each of which are incorporated herein by reference.

BACKGROUND OF THE INVENTION

1. Technical Field

The present invention relates to compositions comprising nanoparticles of a metal and/or alloy or nanoparticles comprising a metal or alloy core surrounded by an oxide shell in admixture with platinum particles in a catalyst ink. More particularly, the composition is useful for inks used to make anode and cathode electrodes, which may be used in electrochemical devices, such as direct methanol fuel cells (DMFCs), direct formic acid fuel cells (FAFCs), hydrogen fuel cells ($H_2$-PEMFCs), and alkaline fuel cells (AFCs).

2. Related Art

Platinum is highly catalytic for hydrocarbon or hydrogen oxidation and oxygen reduction in gas diffusion electrodes for a variety of fuel cells. However, this noble metal is a rapidly depleting non-renewable resource and is consequently expensive. Current price for bulk platinum black is $75.00/gram. The associated cost of a platinum deposited electrode, typically loaded anywhere from 2-8 mg/cm$^2$, is widely considered to be a hurdle to widespread commercialization. With the gaining demand for alternative energy sources by consumers, efficient catalysts, especially at practical operating temperature (room temperature to 60° C.) must be discovered to alleviate the demand and expense of platinum. Based on this, considerable effort is being dedicated to find an alternative catalyst which can match or exceed platinum's electrical performance. Method of synthesis of metal nanoparticles has been previously described in U.S. patent application Ser. No. 10/840,409, as well as their use in air cathodes for batteries in U.S. patent application Ser. No. 10/983,993 both of which applications have the same assignee as the present application. The disclosures of these applications are incorporated herein by reference.

SUMMARY OF THE INVENTION

The present invention comprises an improved composition that itself is useful in electrochemical applications, including electrodes and in fuel cells. One embodiment of the present invention comprises an admixture of at least platinum particles and metal nanoparticles. The composition could be used to form an ink that further comprises an ionically conductive material, such as a polymer, capable of ionic networking throughout the ink composition so as to create a substantially structurally coherent mass without significantly impacting the reactivity of a substantial number of the nanoparticles. The polymer may comprise a proton-conducting, perfluorinated, resin.

The nanoparticles may comprise a metal that, when in admixture with the platinum particles, beneficially alters the characteristics of the platinum, including metals selected from one or more of the metals in groups 3-16, lanthanides, combinations thereof, and/or alloys thereof. It is advantageous, but not mandatory, for a substantial portion of the nanoparticles to be less than about 500 nm. One embodiment of the composition may also comprise electrically conductive, porous, substrate particles in intimate contact with the nanoparticles and platinum.

In one application, the ink may be used to form a catalyst whereby the ink is applied to an electrically conductive backing material, such as carbon paper or fibers. In another application, the ink may be used to form an electrode whereby the ink may be applied to an electrically conductive material, and wherein the ink comprises an admixture of platinum particles and metal nanoparticles. Again, it is advantageous but not mandatory that a substantial portion of the nanoparticles be less than about 500 nm. In one embodiment, the ink may comprise metal nanoparticles prepared by a vapor condensation process and an ionically conductive material.

An electrode made from one embodiment of the present inventive composition may be, for example, a gas diffusion electrode. It could also be a liquid diffusion electrode. Other electrodes are contemplated as well. In one embodiment, the electrode comprises an ion-exchange membrane disposed on both faces thereof, wherein the membrane is configured to promote the transportation of ions generated by electrochemical reaction of anode fuel. In one application, the electrode may be used to form a fuel cell, wherein the fuel cell is configured to consume a fuel whereby electricity may be generated.

DETAILED DESCRIPTION OF SOME PREFERRED EMBODIMENTS

Figure 1:
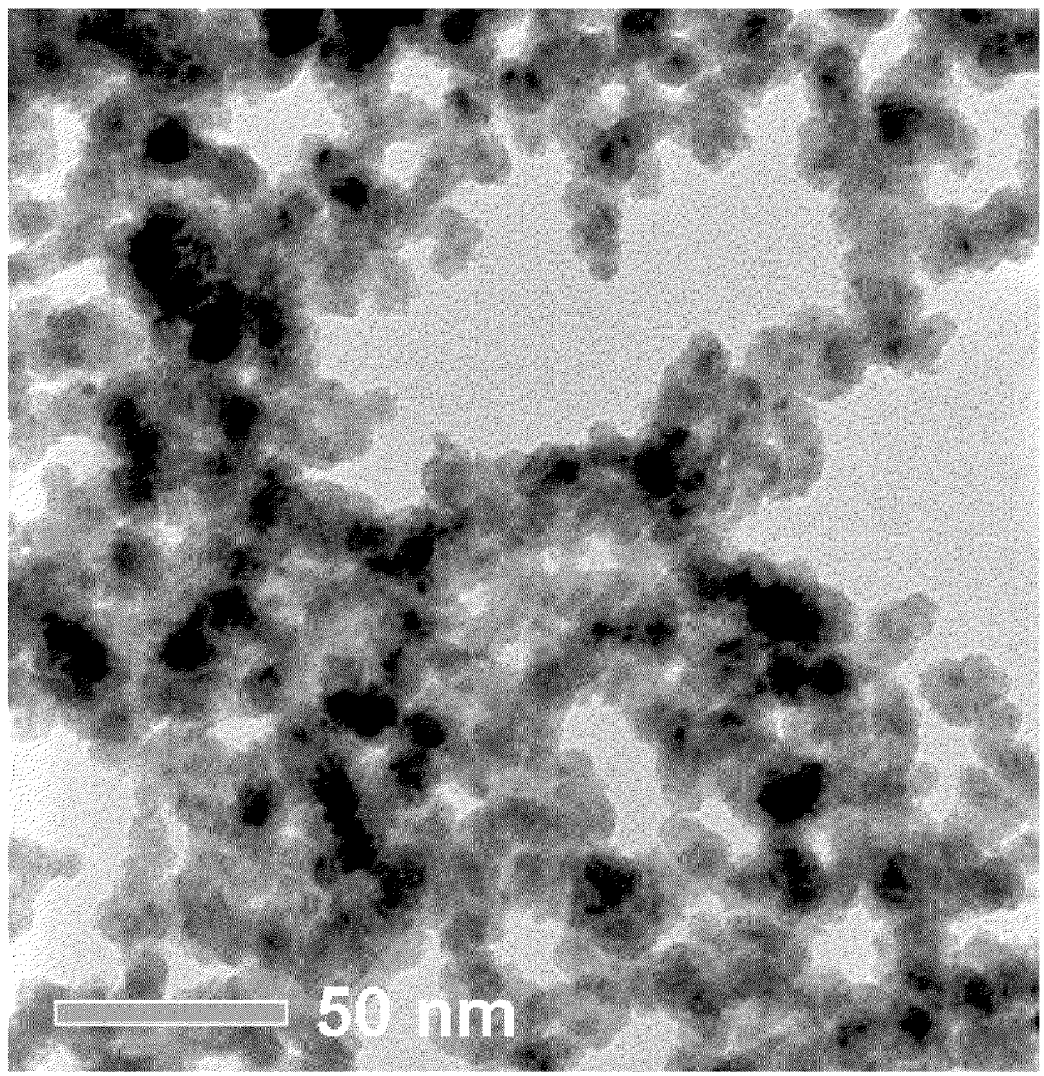
FIG. 1 is a transmission electron micrograph of cobalt metal nanoparticles.

Compositions of preferred embodiments can comprise nanoparticles in admixture with platinum particles in an ink solution. As discussed in greater detail below, in some embodiments, the nanoparticles comprise metals, metal alloys, oxides thereof, and combinations thereof. The platinum particles are also nanoscale. The ink solution comprises at least one alcohol or low-boiling point hydrocarbon, water, and an ionomer. In other embodiments, platinum is eliminated, such that the ink consists of nanoparticles, least one alcohol or low-boiling point hydrocarbon, water, and an ionomer. The compositions of preferred embodiments are useful in the manufacture of electrodes, which are incorporated, for example, into electrochemical cells, fuel cells, and the like.

As used herein, the term "admixture" refers to species that are blended together in such a fashion that the nanoparticles and platinum particles are in intimate contact with one another.

Compositions of the preferred embodiments can comprise blending nanoparticles and platinum in a solution containing an ion-conducting polymer, for example, a perfluorinated ionomer resin. The ionomer content has a relative proportion from about 5 to 40% be weight of the total particle content, where total metal content is the combined weight of nanoparticles and platinum. More preferably, the ionomer content is from about 10 to 30% of the total particle content, and most preferably 10 to 20%. Addition of ionomer enhances physical contact between the electrode and the fuel cell membrane, and also promotes ionic conductivity at the electrode-membrane interface. The most common type of fuel cell membrane is the proton exchange membrane, in which case the ionomer is proton conducting, such as Nafion®. Preferably, the ink contains enough of the ionomer such that adhesion to the membrane and ionic conductivity are enhanced. At high concentrations of ionomer, a large resistance builds in the electrode, and blocks electrons from efficiently moving through the external circuit of the fuel cell. Likewise, when the ionomer content is to low, ion transport efficiency decreases, which also leads to increased cell resistance and lower power.

In this catalytic ink formula, the platinum particles should preferably be small enough such that they can have strong surface interactions with the nanoparticles. Preferably, the platinum should be finely divided. Platinum is considered to be finely divided when the particle size is below a micron, preferably below 500 nm in diameter such as from 1 to 500 nm. Although finely divided platinum particles are adequate, it is preferred that the platinum particles have a diameter below 100 nm to maximize the platinum-nanoparticle surface contact. Preferred diameter of platinum particles are 1 to 100 nm, more preferably from 5 to 50 nm, most preferably from 5 to 25 nm.

Additionally, some of the compositions of the preferred embodiments include the addition of high surface area substrate particles. In some embodiments, the substrate particles are electrically conductive, comprising, for example, carbon, graphite, carbon nanotubes, carbon fibers, combinations thereof, and the like. In some embodiments, the composition comprises nanoparticles, platinum particles, water, alcohol and/or low boiling point hydrocarbon, ionomer, and substrate particles with a relative proportion of about 1 to 100% nanoparticles, 1 to 75% platinum particles, from about 5 to 40% ionomer, and from about 1 to 50% substrate particles.

Historically, platinum has been the best performing catalyst in a wide variety of fuel cells and batteries, and until now platinum was the only practicable catalyst for high power hydrogen and direct methanol fuel cell electrodes. The demand for fuel cells, hydrogen electrolysis and other non-petroleum based energy sources could conceivably consume all of the world's production of platinum. By virtue of their increased surface areas, nanoparticles of the preferred embodiments, such as those of cobalt, palladium, and other transition elements, along with their alloys and corresponding oxides thereof, exhibit increased catalytic activity, and are promising platinum replacement candidates for a variety of battery and fuel cell applications.

The increased surface area of the reactive metal alloy particles, also known as "nanoparticles", compared to the surface area of the metal substrate particles is high due to the very large number of atoms on the surface of the nanoparticles. Referring to FIG. 1, a transmission electron micrograph of cobalt nanoparticles is shown. Each cobalt nanoparticle has an oxide shell. As an example, a cube comprising a plurality of three nanometer cobalt particles considered essentially as tiny spheres. As such, they would have about ten atoms on each side, about one thousand atoms in total. Of those thousand atoms, 488 atoms would be on the exterior surface and 512 atoms on the interior of the particle. This means that roughly half of the nanoparticles would have the energy of the bulk material and half would have higher energy due to the absence of neighboring atoms (cobalt atoms in the bulk material have about twelve nearest neighbors while those on the surface has nine or fewer). A three micron sphere of cobalt would have 10,000 atoms along each side for a total of one trillion atoms. There would be 999.4 billion of those atoms in the bulk (low energy interior) material. That means that only 0.06% of the atoms would be on the surface of the three micron-sized material compared to the 48.8% of the atoms at the surface of the three nanometer cobalt particles.

By virtue of their high surface area to volume ratio, nanoparticles exhibit improved catalytic activity relative to larger particles with comparable material compositions. Consequently, when a metal, metal alloy, and/or oxide particle diameter is on the nano-scale, associated catalytic properties are dramatically enhanced in some embodiments. The preparation of such nanoparticle catalysts has been described, for example, in U.S. patent application Ser. No. 10/840,409, filed May 6, 2004, the contents of which are incorporated herein by reference in their entireties. FIG. 1 is a transmission electron microscopy (TEM) photograph of a cobalt nanoparticle catalyst, prepared as described above, illustrating size uniformity of the nanoparticles. Some of the illustrated nanoparticles are generally spherical with diameters of just a few hundred atoms.

Nanoparticles can be used to replace and/or supplement platinum or other catalysts in electrodes, for example, in fuel cell or battery cathodes. In some preferred embodiments, the nanoparticles comprise a metal, a metal alloy, an oxide thereof, or combinations thereof. In some embodiments, the metal is selected from the group including transition metals of groups 3-16, lanthanides, and mixtures combinations, and/or alloys thereof. More preferably, the metal is selected from groups 7, 8, 9, 10, 11, and the lanthanides. Preferred embodiments include nanoparticles of metals, metal alloys, and the oxides thereof that are at least nearly as active as platinum for a reduction of oxygen in at least one electrolyte environment of commercial or other (e.g., research) significance, for example, palladium, manganese, nickel, cobalt, and/or silver. Embodiments of nanoparticles of palladium and palladium alloys comprising an oxide thereof exhibit significant performances relative to platinum.

Figure 2:
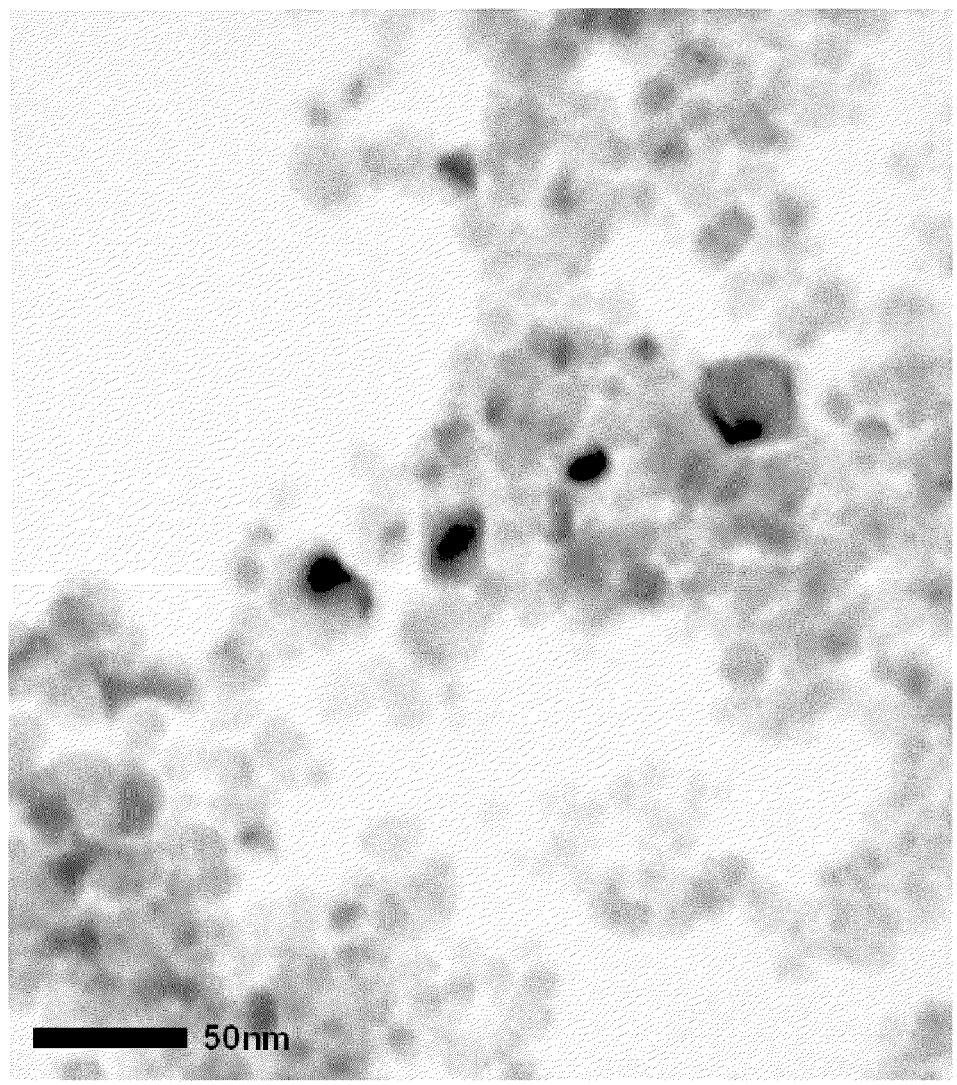
FIG. 2 is a transmission electron micrograph of cobalt-nickel alloy nanoparticles.

In some embodiments, nanoparticles comprise an alloy, the alloy preferably comprises two or more metals, wherein preferably wherein at least one of the metals discussed above. Some embodiments of the alloy can comprise two, three, four or more metals. The ratio of metals in the alloy can be adjusted depending on the particular application. In some embodiments, one metal of the alloy comprises from about 5% to about 95% by weight of the alloy. In some embodiments, one metal comprises more than about 10% by weight, or more than about 25% by weight, of the alloy. In some embodiments, one metal comprises up to about 90% by weight of the alloy. For example, FIG. 2 shows a transmission electron image of cobalt/nickel alloy nanoparticles.

In preferred embodiments, the nanoparticles include metal nanoparticles, metal alloy nanoparticles, metal and/or metal alloy nanoparticles comprising an oxide shell, nanoparticles that are substantially or completely an oxide of the metal and/or metal alloy, or mixtures thereof. Preferably, the nanoparticles have a diameter of less than about 100 nanometers, more preferably less than about 50 nanometers, even more preferably less than about 30 nanometers, and most preferably less than about 15 nanometers. In some embodiments, the standard deviation of the nanoparticle diameter distribution is less than about four nanometers, preferably less than about two nanometers. The use of the prefix "n" or "nano" before a material indicates that the material is nanoparticulate. In initial studies, it was found that particles at the micron level do not exhibit the catalytic enhancing effect that the nanoparticles show. In studies using micron sized-metal particles and platinum in the ink, a decrease in performance was observed due to lower surface area. Further, the micron particles fall out of the electrode, and ultimately lead to electrode failure. Thus, the high surface area nanoparticles are necessary for proper electronic interaction and dispersion with platinum.

Preferred embodiments of the nanoparticles comprise an oxide shell and/or layer. This oxide shell can preferably comprise up to about 70% of the total weight of the nanoparticle, and depending on the particle size, the layer can have a thickness of from about 0.1 nm to greater than about 25 nm, preferably from about 0.1 to about 10 nm. It is believed that the oxide shell can provide one or more functions, such as aiding the catalytic reaction, imparting stability, and/or reducing particle agglomeration. A plurality of oxide species can be employed, for example, oxides of different oxidation states, allotropes, crystal forms, solvates, combinations and the like. The amount of the oxide shell of the nanoparticles can be adjusted based on the application. For example, the oxide shell can comprise less than about 70%, less than about 60%, less than about 50%, less than about 40%, less than about 30%, less than about 10%, or less than about 5% by weight of the nanoparticle. In some embodiments, the nanoparticles are produced by vapor condensation in a vacuum chamber; however, other methods for forming nanoparticles as are known in the art can also be employed. The oxide thickness can be controlled by introduction of air or oxygen into the chamber as the particles are formed. In some embodiments, the nanoparticles in the final device, for example, an electrode, are substantially or entirely oxidized; that is, substantially all of the metal or metal alloy has been converted to the corresponding oxide. In other embodiments, the alloy comprises a first metal that is susceptible to oxidation and a second metal that is resistant to oxidation. Partial or complete oxidation of such particles results in unoxidized or partially oxidized domains of the second metal dispersed in an oxide of the first metal.

A fuel cell is a device which converts chemical energy directly into electrical energy, via consumption of a fuel, such as an alcohol hydrogen, or other hydrocarbon, at the negative terminal (anode) and consumption of oxygen fuel at the positive terminal (cathode). This device is highly advantageous in that fuel can be consistently be resupplied; the device will operate as long as anode and cathode are supplied with fuel. The anode fuel is oxidized on a catalyst surface to produce electrons and ions. Ions flow through the ion exchange membrane, and the electrons flow through an external circuit, generating electricity. Electrons and ions then recombine at the cathode catalyst surface with the cathode fuel. At the core of the fuel cell is the membrane-electrode assembly (MEA). The MEA consists of a membrane capable of exchanging ions such as H+ or OH−, a catalyst layer applied to each side of the membrane, and an electrically conductive backing on each catalyst layer. Good adhesion and interaction between these layers is critical for a fuel cell to operate at the highest power.

To promote excellent catalyst utilization as well as electronic and ionic flow within the fuel cell, the composition and interfaces of the catalyst layer are critical to achieving low ohmic resistance and increased power output.

Fuel cell anode catalyst inks are typically prepared from platinum/ruthenium alloy metal particles, water, alcohol, and an ionomer that promotes ionic conductivity. Cathode catalyst inks are typically prepared from platinum metal particles, water, alcohol, and ionomer. In both cases, the inks are mixed to form a uniform dispersion of catalyst and ionomer. In some instances the platinum-based catalysts are supported on carbon particles to further promote even distribution.

Due to increased surface area, when nanoparticles are blended with platinum/ruthenium or platinum, water, and an ionically conducting polymer to form an ink, the activity of platinum is increased due to enhanced contact of the platinum and the nanoparticles. This contact serves two main functions, a) to enhance the electronic interaction of platinum with the oxidant or reductant by virtue of increasing the d-orbital vacancy on Pt by the nanoparticles, and b) to efficiently disperse Pt throughout the ink so that it has improved contact with the oxidant and/or reductant. Additionally, metal alloy nanoparticles also provide these benefits. A metal alloy nanoparticle is a compound which has individual metal components combined in such a way such that combination gives the compound unique chemical structure and properties in each individual particle.

Addition of nanoparticles to the catalyst ink can give other benefits, such as improved tolerance to anodic reactants that permeate the fuel cell membrane. For example, in a direct methanol fuel cell (DMFC), methanol can permeate the proton exchange membrane and react on the cathode catalyst. The result is a parasitic decrease in voltage and power. If palladium nanoparticles are added to the cathode catalyst ink, the result is an improved tolerance to methanol, and therefore a reduction in power loss.

In a direct oxidation fuel cell, such as the direct methanol fuel cell, the ionomer conducts protons. A typical ionomer used in the ink is Nafion®, a perfluorinated ion exchange polymer. The polymer resin contains both hydrophilic and hydrophobic domains such that there is a balance of both water-rejecting and water accepting properties. Although water provides improved proton conduction, an excess of water blocks catalyst sites from the oxidant and reductant, thereby lowering fuel cell efficiency.

The ratio of platinum to the nanoparticles will largely depend on the mode of fuel cell operation. The catalyst blend is very sensitive to oxidant and reductant concentration and temperature. Due to the high cost of platinum, high nanoparticle fractions are ideal. A minimum of 5% nanoparticles (i.e., without platinum) by weight of total metal content is preferred to observe increased catalytic activity, however over 90% of platinum by weight of conventional compositions can be replaced with the nanoparticles. Most preferably, 50 to 75% of platinum particles are replaced by metal and/or alloy nanoparticles.

The ink composition is prepared by mixing dry platinum and dry nanoparticles in any ratio, such as those specified above. Preferably, several drops of water are added to the mixture to minimize the risk of fire. Finally, the ionomer of specified amount is added, and the resulting ink is blended, for example, on a vortex mixer and sonicated, for example, for several minutes. The electrode is prepared by depositing the ink on a conductive support. The conductive support conducts electrons from the membrane-electrode interface to the fuel cell external circuit.

Figure 3:
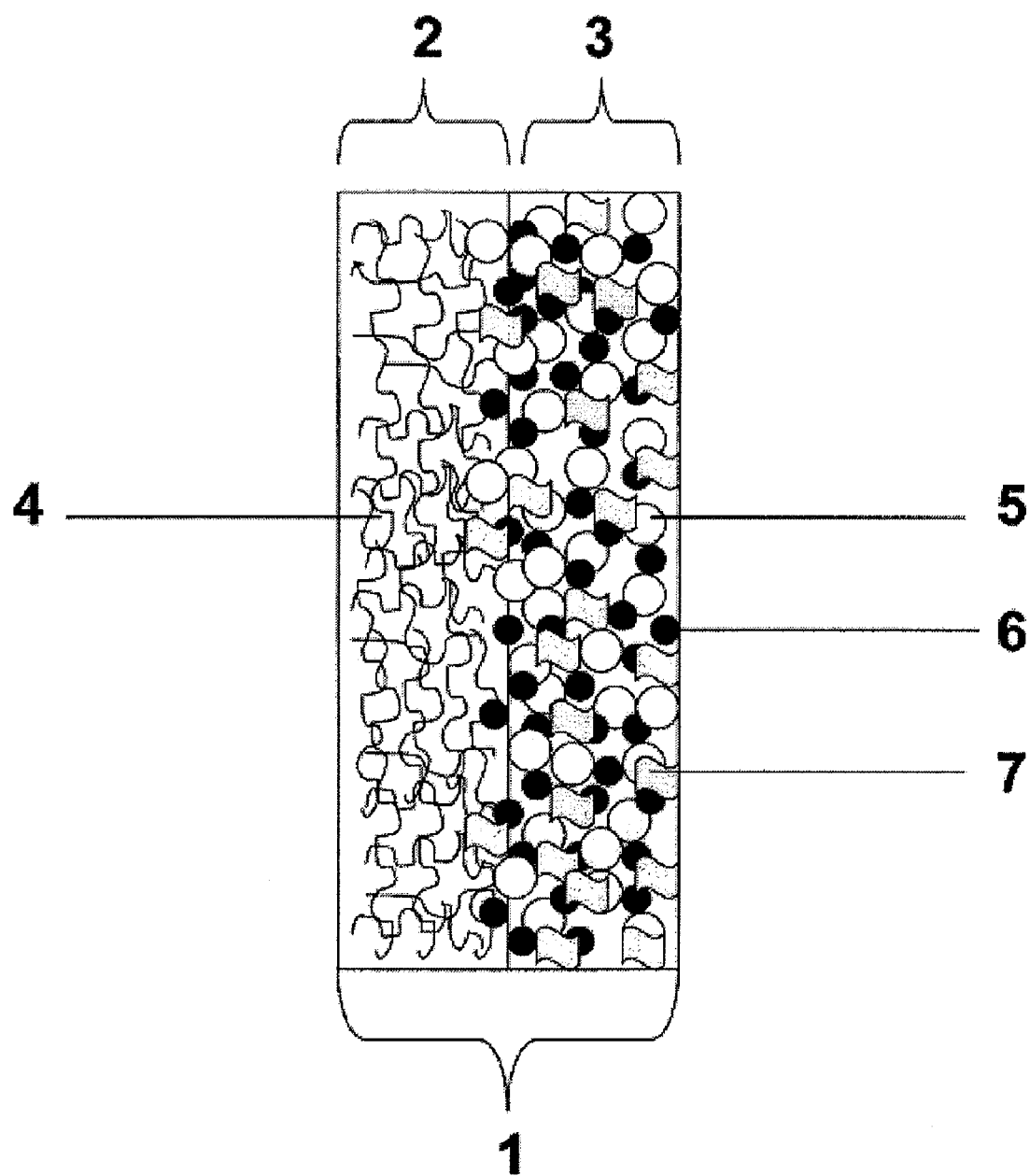
FIG. 3 details the cross-section of a direct oxidation fuel cell anode or cathode electrode.

The ink is usually applied to the electron-conducting support by direct painting, spraying, or screen printing. The method chosen is not critical to electrode performance in the fuel cell, however the method should preferably ensure an even coating of ink across an entire surface of the electrode. FIG. 3 depicts a cross-section of a fuel cell cathode electrode 101, composed of electron-conducting support 102 and catalyst layer 103. Electron-conducting support 102 is composed of carbon fibers 104, which generally have an open structure to allow for the movement of reactants to the catalyst surface. In the catalyst layer, platinum particles 105 and nanoparticles 106 are in intimate contact with one another, and supported inside a matrix of ionomer 107. The catalyst ink may likewise be directly applied to the ion-exchange membrane by similar methods.

The ideal material to use for the electron-conducting support is carbon, however other electronically conducting materials can also work. Woven carbon paper or fabric serves to support the ink, conduct electrons, and allow for the influx of oxidant and reductant by virtue of its porous nature. The support can be modified with a water-rejecting polymer to improve water management properties during fuel cell operation.

In a direct oxidation fuel cell, the electrodes can be thermally pressed to either side of an ion conducting membrane. In the case of the direct methanol fuel cell, the electrodes can be applied onto a proton conducting polymer, for example by hot pressing, and subsequently placed in contact with bipolar plates that efficiently conduct electrons. To prevent delamination of the electrodes, a layer of ionomer may be applied to the top of the catalyst ink before pressing to ensure continuity between the membrane and the catalyst layer.

Figure 4:
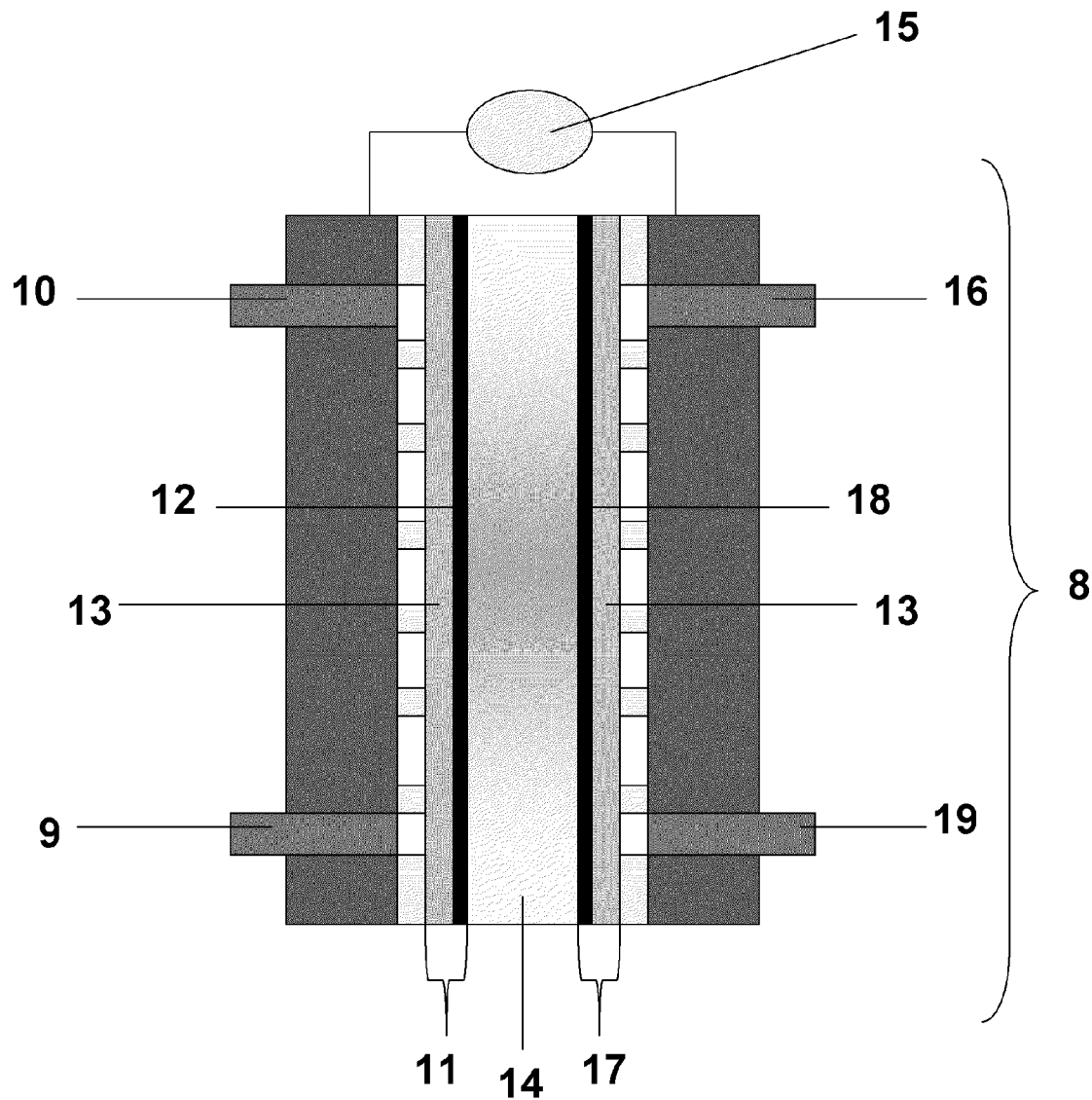
FIG. 4 shows a drawing of a direct methanol fuel cell.

FIG. 4 depicts a direct methanol fuel cell 108. Aqueous methanol is fed into the anode port 109, where it is circulated through port 110 or remains inside the cell. The methanol reacts at the anode electrode 111 (encompassing ink 112 and the electron-conducting support 113) to produce carbon dioxide, protons, and electrons. Protons pass through the proton exchange membrane 114 to the cathode compartment, and electrons flow through the external circuit 115 and into the cathode. Air is fed into the cathode port 116, where it reacts with electrons and protons produced from the anode on the cathode electrode 117 (encompassing ink 118 and electron-conducting support 113) to produce water, which is removed at the other cathode port 119.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The following examples describe the manufacture of particular embodiments of the compositions, electrodes, and devices disclosed herein. Those skilled in the art will understand these descriptions are exemplary and modifications as to proportions and scale are possible.

EXAMPLE 1

Preparation of an Electrode

In a small vial, 200 mg of Pt/C and 50 mg of palladium nanoparticles blended on a vortex mixer with 1 mL of deionized water, until the powders were fully wetted. To this mixture, an appropriate amount of 5 wt % Nafion® solution in lower alcohols and 4 mL of isopropyl alcohol were added. The mixture was blended on a vortex mixer for an additional 30 seconds, followed by at least one hour sonication in an ice bath. The ink mixture was then applied to a carbon backing material by painting in thin layers.

Likewise, the Pt/C catalyst and nanoparticles can be applied in a serial fashion. In this case, 200 mg of Pt/C was blended in a vortex mixer with 1 mL of deionized water, until the powders were fully wetted. To this mixture, an appropriate amount of 5 wt % Nafion® solution in lower alcohols and 4 mL of isopropyl alcohol were added. The mixture was blended on a vortex mixer for an additional 30 seconds, followed by at least one hour sonication in an ice bath. The ink mixture was then applied to a carbon backing material by painting in thin layers and dried. Then, 50 mg of cobalt nanoparticles blended on a vortex mixer with 0.3 mL of deionized water, until the powders were fully wetted. To this mixture, an appropriate amount of 5 wt % Nafion® solution in lower alcohols and 1 mL of isopropyl alcohol were added. The mixture was blended on a vortex mixer for an additional 30 seconds, followed by at least one hour sonication in an ice bath. The ink mixture was then applied to the Pt/C catalyst layer and dried.

EXAMPLE 2

Preparation of an Electrode

In a small vial, 200 mg of Pt—Ru/C and 50 mg of chromium nanoparticles were blended on a vortex mixer with 1 mL of deionized water, until the powders were fully wetted. To this mixture, an appropriate amount of 5 wt % Nafion® solution in lower alcohols and 4 mL of isopropyl alcohol were added. The mixture was blended on a vortex mixer for an additional 30 seconds, followed by at least one hour sonication in an ice bath. The ink mixture was then applied to a carbon backing material by painting in thin layers.

EXAMPLE 3

Preparation of an Electrode

In a small vial, 200 mg of palladium nanoparticles were blended on a vortex mixer with 2 mL of N-methyl pyrolidinone, until the powder was fully wetted. To this mixture, an appropriate amount of 5 wt % Nafion® solution in lower alcohols and 2 mL of water were added. The mixture was blended on a vortex mixer for an additional 30 seconds, followed by at least one hour sonication in an ice bath. The ink mixture was then applied to a carbon backing material by painting in thin layers.

EXAMPLE 4

Preparation of a Membrane-Electrode Assembly

The electrodes prepared in the above examples were treated with a layer of 5 wt % Nafion® solution and allowed to dry in an oven at 100° C. for 5 minutes. The anode and cathode electrodes were then hot-pressed onto each side of a Nafion® membrane at 140° C. for 5 minutes at 1000 psi, and allowed to cool under light force. The resulting membrane-electrode assembly was then hydrated at 80° C., between two porous plates under light pressure for at least 12 hours before use.

EXAMPLE 5

Electrochemical Performance of Nanocatalysts

Figure 5:
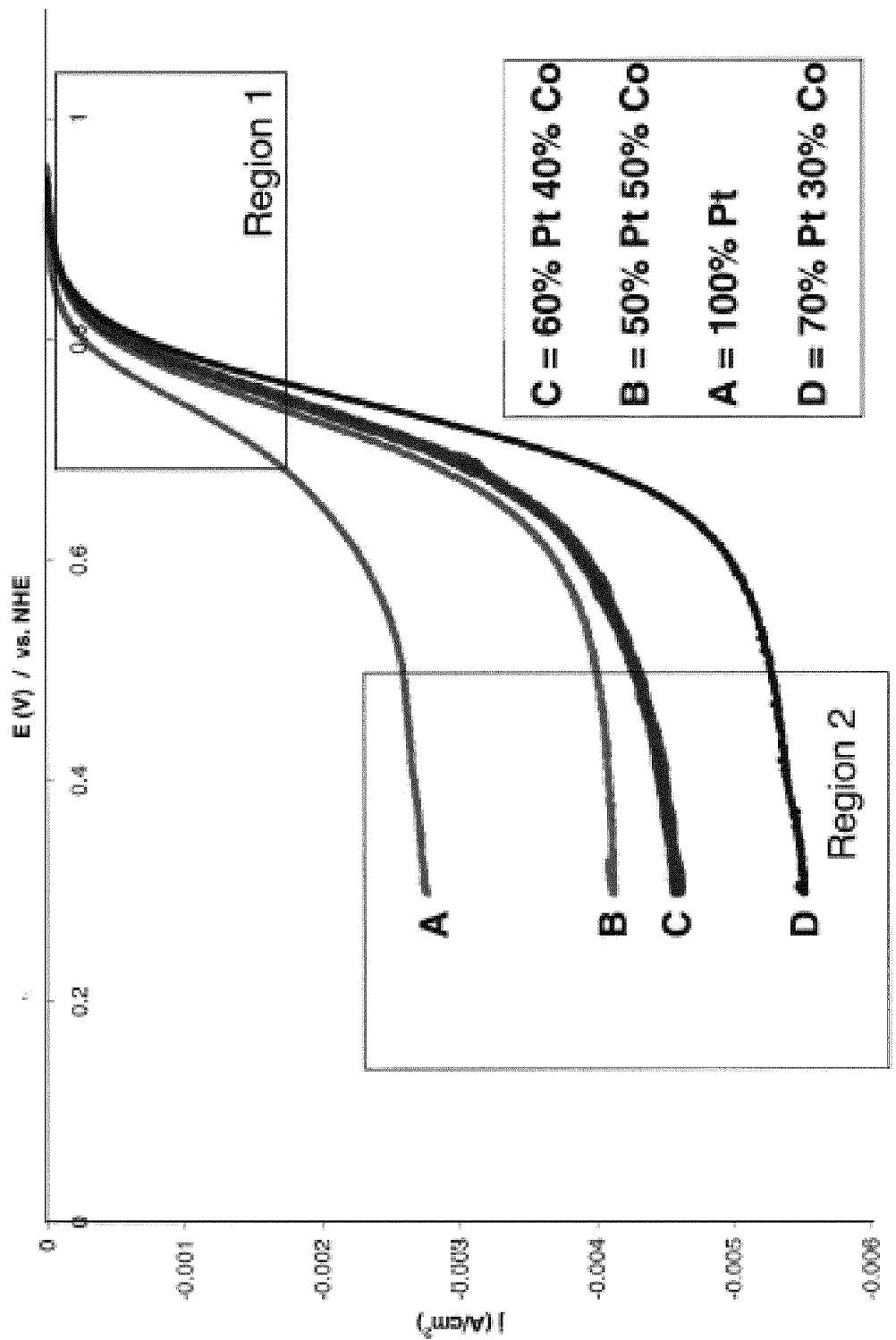
FIG. 5 shows a voltammogram of cathode electrode performance.

As one example, FIG. 5 data shows a linear sweep voltammogram of the fuel cell cathode reaction, which depicts how current density, j, increases as voltage, V, decreases. The total metal loading in each ink sample is 8 mg/cm$^2$. The greater the magnitude of the current increases as voltage decreases, the better the performance of the catalyst ink. Curve A represents a fuel cell cathode catalyst ink containing finely divided platinum and no nanoparticles. Curves B-D show the increased performance by removing some of the platinum and replacing it with 8 nm diameter cobalt metal nanoparticles. As shown by replacing at least 50% by total metal weight of the platinum with cobalt metal nanoparticles, the current magnitude increase is larger than for the platinum-only electrode ink. Although substituting 30% by total metal weight of the platinum shows the largest current magnitude increase, greater weight fractions of cobalt metal nanoparticles also work well. It is clear in curves B D that by adding these nanoparticles to the catalyst ink, both oxygen reduction kinetics (shown in Region 1) and mass transport (shown in Region 2) are improved. In other types of fuel cell electrodes, greater than 50% of the platinum can be replaced with the nanoparticles, and preferably up to 95% by total metal loading weight can be replaced with nanoparticles.

Figure 6:
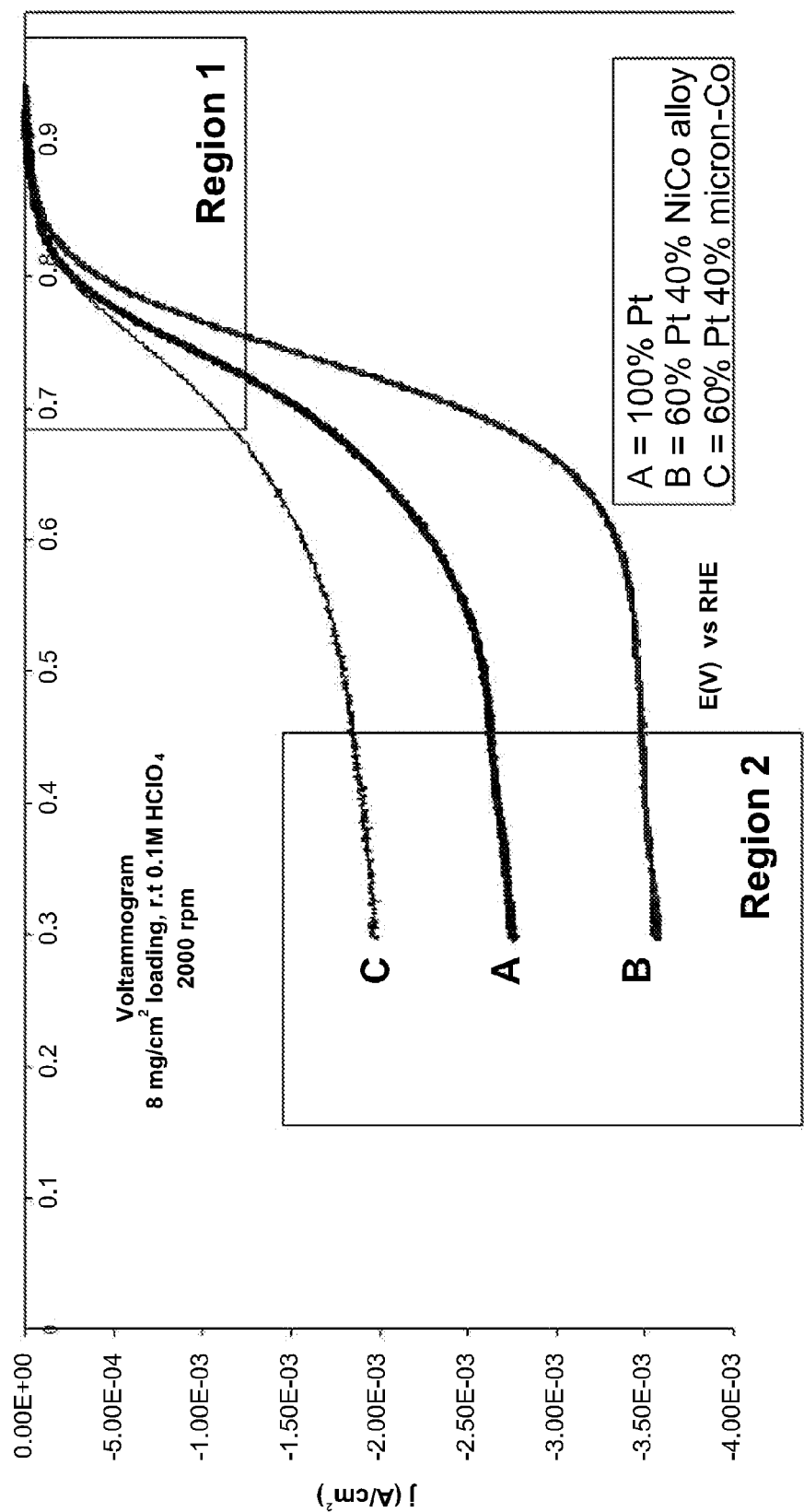
FIG. 6 shows a voltammogram of cathode electrode performance.

FIG. 6 also shows a liner sweep voltammogram of the cathode fuel cell reaction, showing performance increasing using a metal alloy nanoparticle electrode. Total metal loading was 8 mg/cm$^2$ for each sample. It illustrates the improved performance of a 60% platinum 40% nickel-cobalt metal alloy, with average nickel-cobalt metal alloy particle size of 15 nm, electrode (curve B) versus a finely divided platinum electrode (curve A). Similar to the previous example using metal nanoparticles, the current magnitude increases greater with increasing voltage for the metal alloy nanoparticle sample, both in the kinetic activation (Region 1) and mass transfer regimes (Region 2). In addition, a performance inhibiting effect is observed for the electrode containing 60% platinum 40% 800 nm average diameter cobalt particles by weight (curve C). This data illustrates the importance of using nanoparticles, as particles at or above the micron size observably decrease electrode performance due to the incompatible surface areas of the finely divided platinum, at or less than 100 nm and the micron cobalt, in the 800 to 1500 nm size range.

Figure 7:
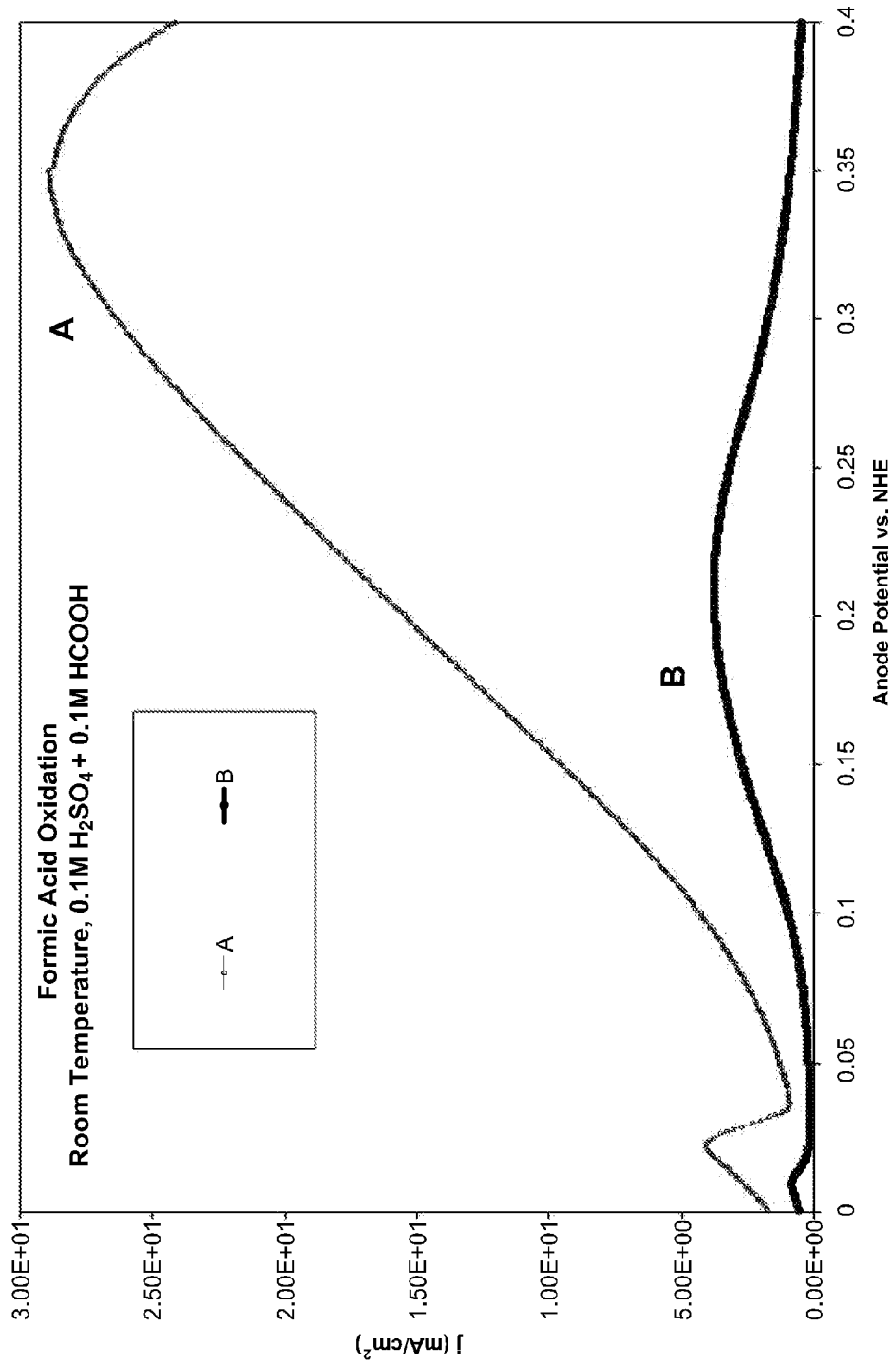
FIG. 7 is a transmission electron micrograph of palladium metal nanoparticles.

FIG. 7 illustrates the performance increase of formic acid oxidation higher surface area palladium nanoparticles prepared by a vapor condensation process, versus prepared by another method. The palladium nanoparticles prepared by the vapor condensation process have a surface area of 70 m$^2$/g, versus 20 m$^2$/g for palladium prepared by another method. The increased surface area reflects a direct improvement in catalytic ability.

Figure 8:
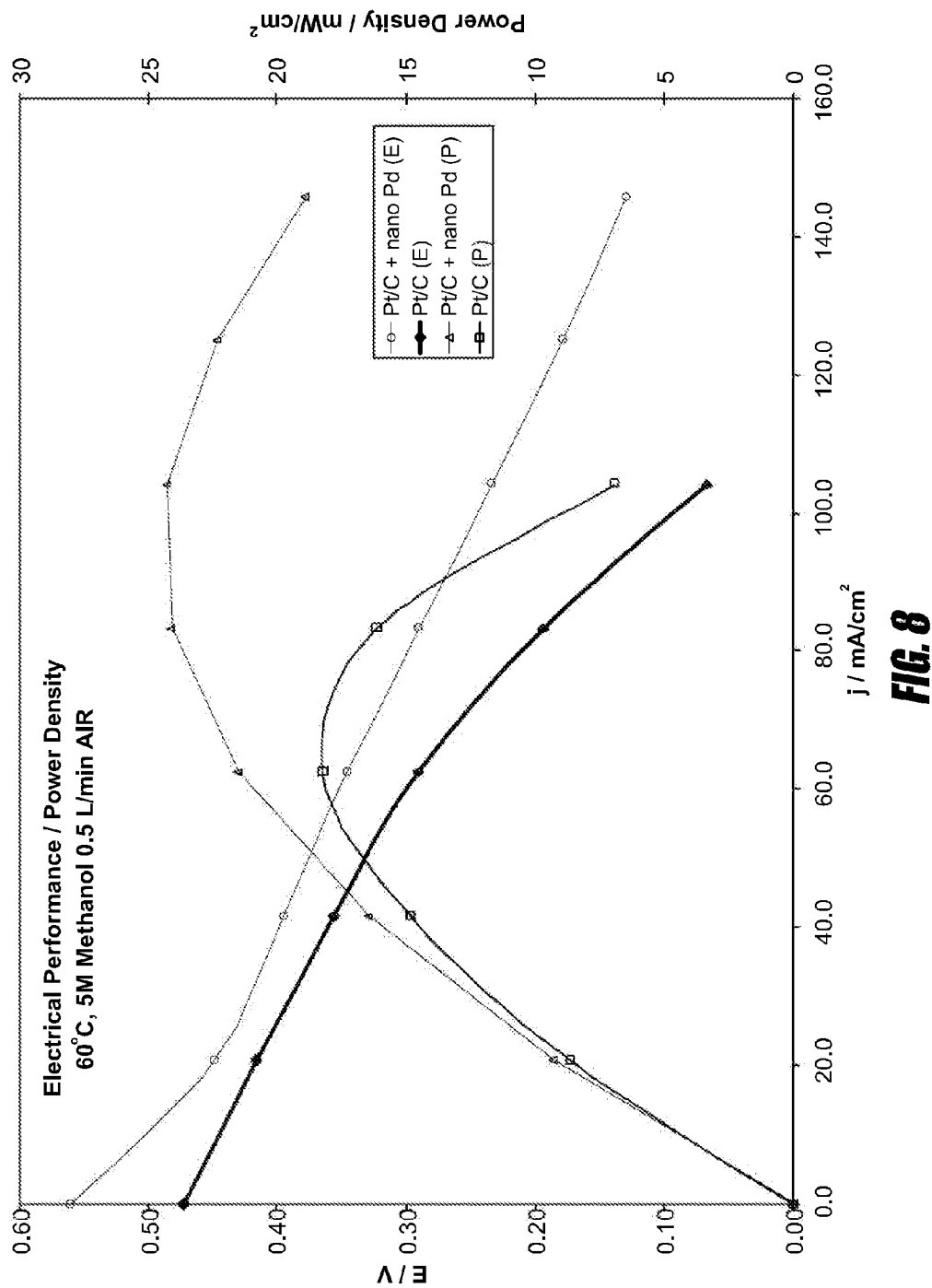
FIG. 8 shows an electrical performance and power density curve for a direct methanol fuel cell incorporating palladium nanoparticles.

FIG. 8 illustrates the performance increase of formic acid oxidation higher surface area palladium nanoparticles prepared by a vapor condensation process, versus prepared by another method. The palladium nanoparticles prepared by the vapor condensation process have a surface area of 70 m$^2$/g, versus 20 m$^2$/g for palladium prepared by another method. The increased surface area reflects a direct improvement in catalytic ability.

EXAMPLE 6

Direct Methanol Fuel Cell Performance

FIG. 8 illustrates the performance benefit of the addition of nano-palladium to the cathode ink. The resulting power density is significantly increased, do to an increase in both platinum activity and methanol tolerance.

Figure 9:
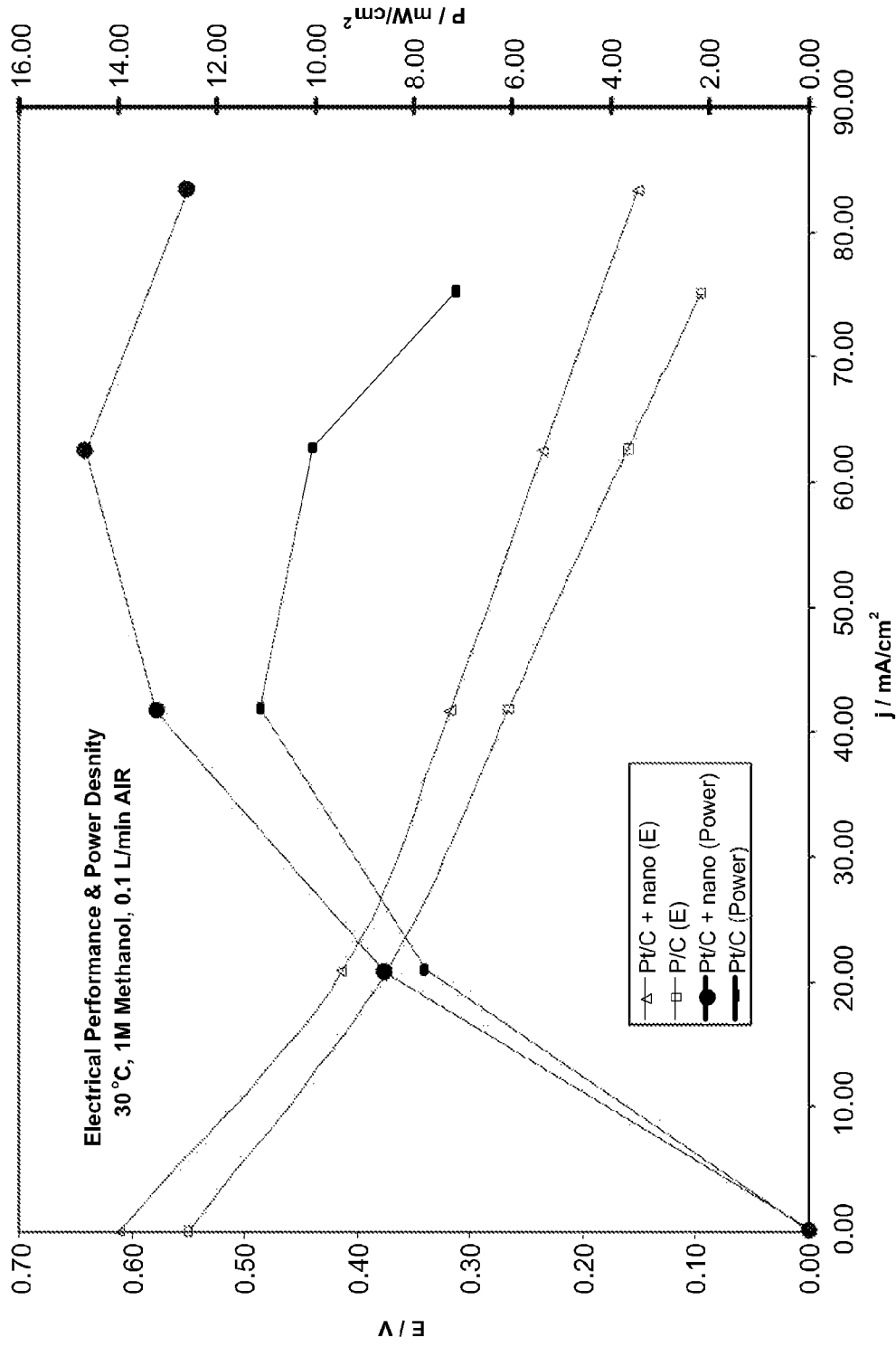
FIG. 9 shows an electrical performance and power density curve for a direct methanol fuel cell incorporating cobalt nanoparticles.

FIG. 9 illustrates the performance benefit of the addition of nano-palladium to the cathode ink. The resulting power density is significantly increased, do to an increase in both platinum activity and water management.

All references cited herein are expressly incorporated herein by reference in their entireties. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A composition suitable for use in a direct methanol fuel cathode, the composition comprising nanoparticles comprising a metal core and a shell comprising an oxide of the core metal material, the composition further comprising platinum alloy particles substantially devoid of an oxide shell, and an ion-conducting polymer.

2. The composition of claim 1, wherein the metal nanoparticles comprise one or more of palladium, chromium, manganese, nickel, iron, copper, gold, lanthanum, cerium, tin, sulfur, selenium, cobalt, silver, and alloys thereof.

3. A direct methanol fuel cell comprising a cathode comprising the composition of claim 2.

* * * * *